(12) United States Patent
Tamada

(10) Patent No.: US 8,016,344 B2
(45) Date of Patent: Sep. 13, 2011

(54) VEHICLE IMPACT ABSORBING MEMBER

(75) Inventor: Teruo Tamada, Yokohama (JP)

(73) Assignee: Kyoraku Co., Ltd., Tokyo (JP)

( * ) Notice: Subject to any disclaimer, the term of this patent is extended or adjusted under 35 U.S.C. 154(b) by 372 days.

(21) Appl. No.: 11/576,352

(22) PCT Filed: Sep. 30, 2005

(86) PCT No.: PCT/JP2005/018584
§ 371 (c)(1),
(2), (4) Date: Dec. 20, 2007

(87) PCT Pub. No.: WO2006/036030
PCT Pub. Date: Apr. 6, 2006

(65) Prior Publication Data
US 2008/0203749 A1   Aug. 28, 2008

(30) Foreign Application Priority Data

Sep. 30, 2004   (JP) .................................. 2004-288025

(51) Int. Cl.
*B60J 7/00*   (2006.01)
(52) U.S. Cl. ................................................ 296/187.03
(58) Field of Classification Search ............ 296/187.03, 296/146.6, 187.05; 267/139, 140; 74/492; 188/377; 36/28; 280/751, 748, 777; 293/133, 293/1, 102, 120, 136
See application file for complete search history.

(56) References Cited

U.S. PATENT DOCUMENTS

| | | | | |
|---|---|---|---|---|
| 3,802,602 A * | 4/1974 | Wilson | ........................ | 244/100 R |
| 3,951,427 A * | 4/1976 | Wilfert | .......................... | 280/732 |
| 4,123,948 A * | 11/1978 | Zeller | ............................. | 74/492 |
| 5,395,674 A * | 3/1995 | Schmidt et al. | ............... | 428/178 |
| 5,433,478 A * | 7/1995 | Naruse | .......................... | 280/751 |
| 6,406,079 B2 * | 6/2002 | Tamada et al. | ................. | 293/120 |
| 7,111,713 B2 * | 9/2006 | Tamada et al. | ................. | 188/371 |
| 7,143,876 B2 * | 12/2006 | Tamada et al. | ................. | 188/371 |
| 7,178,647 B2 * | 2/2007 | Tamada et al. | ................. | 188/371 |

(Continued)

FOREIGN PATENT DOCUMENTS

JP   10250513   9/1998

(Continued)

OTHER PUBLICATIONS

PCT Search Report dated Nov. 7, 2005 of Patent Application No. PCT/JP2005/018584 filed Sep. 30, 2005.

*Primary Examiner* — Kiran B. Patel
(74) *Attorney, Agent, or Firm* — Vern Maine & Associates

(57) ABSTRACT

Provided is a shock absorber for a vehicle, which, when it is crushed, can break and open a part of the wall thereof earlier than the time of the break of an explosion inducing section, to thereby exclude the effect of the air being present inside a hollow portion and exhibit stable shock-absorbing capability and also maintain a satisfactory shock-absorbing capability over a wide range of temperature from a high temperature to a low temperature independently of the temperature of the open air. A shock absorber (1) is a hollow structure integrally molded through blow molding. The shock absorber (1) has at least one explosion inducing section (12). The explosion inducing section (12) comprises a protruded ridge (13) in a notch form formed on the surface of the wall of the shock absorber (1). The shock absorber (1) comprises a thermoplastic polymer alloy of a polyolefin type resin and an amorphous resin.

8 Claims, 14 Drawing Sheets

U.S. PATENT DOCUMENTS

| | | | |
|---|---|---|---|
| 7,306,080 B2 * | 12/2007 | Tamada et al. | 188/377 |
| 7,306,081 B2 * | 12/2007 | Tamada et al. | 188/377 |
| 7,370,893 B2 * | 5/2008 | Tamada et al. | 293/120 |
| 7,618,082 B2 * | 11/2009 | Tamada | 296/146.6 |
| 2004/0129518 A1 * | 7/2004 | Tamada et al. | 188/377 |
| 2008/0203749 A1 * | 8/2008 | Tamada | 296/1.04 |
| 2008/0254261 A1 * | 10/2008 | Tamada | 428/166 |

FOREIGN PATENT DOCUMENTS

| | | |
|---|---|---|
| JP | 2000177518 | 6/2000 |
| JP | 2000193008 | 7/2000 |
| JP | 2004149074 | 5/2004 |
| JP | 2004262342 | 9/2004 |
| WO | 2006/036030 A1 | 6/2006 |

* cited by examiner

VEHICLE IMPACT ABSORBING MEMBER

RELATED APPLICATIONS

This application is a US National Phase of PCT Application No. PCT/JP2005/018584, filed 30 Sep. 2005, which claims priority to Japanese Patent Application No. JP 2004-288025, filed 30 Sep. 2004. Each of these applications is herein incorporated in its entirety by reference.

TECHNICAL FIELD

The present invention relates to a vehicle impact absorbing member internally provided to any one of vehicle structural members, such as a door, door trim, bodyside panel, roof panel, pillar, and bumper (especially, such as one interposed between a bumper facia and a bumper beam to absorb impact received by the bumper facia), for absorbing impact from an interior portion of the vehicle, such as caused due to collision of a passenger with an inner wall of a vehicle structural member, or impact received from an exterior portion of the vehicle, such as caused due to collision with another vehicle.

BACKGROUND

Japanese Patent Application Laid-Open (JP-A) No. 2004-149074 discloses a vehicle impact absorbing member of the above-described type. The absorbing member has a hollow double-wall structure produced by blow molding of a thermoplastic resin and has a hollow portion. Recessed ribs are formed from front and rear surface walls, and end portions thereof are boded to one another to be integral, thereby to improve impact absorbing property. In addition, the official gazette of Japanese Patent No. 3313999 describes a vehicle impact absorbing member formed from a polypropylene resin having a bend elastic modulus of 5000 to 2500 kg/cm².

JP-A-2000-193008 describes an impact absorbing member, in which slits or notch shapes are formed as breaking triggers in a cylindrical impact energy absorbing member, thereby to cause stable self-breaking. Further, JP-A-2000-177518 discloses a blow-molded hollow-bag shaped in-vehicle lateral side collision dedicated pad, in which the entirety of the pad is caused to be broken by a stress concentration portion to thereby absorb collision energy.

In a vehicle impact absorbing member formed from a blow-molded hollow double-wall structure such as described in JP-A-2004-149074, the impact absorbing member, especially, wall surfaces of the recessed ribs are broken in such a manner as to be crushed during the absorption of energy caused by impact. In conjunction with crushing of the impact absorbing member, air present inside the hollow portion of the impact absorbing member is compressed thereby to increase internal pressure to the extent of imposing influence on the impact absorption property. Such an influence, generally, causes fluctuations in load value, consequently making it difficult to regulate the impact absorption performance.

As in the case of the vehicle impact absorbing member described in the official gazette of Japanese Patent No. 3313999, the configuration formed from the polypropylene resin having the bend elastic modulus of 5000 to 25000 kg/cm² is influenced by the air present inside the hollow portion. In addition, in such a configuration, the stresses in the event of impact absorption is varied by temperature variations of fresh air in the range of from 60° C. to −15° C. Consequently, similarly as above, fluctuation or reduction occurs in load value, thereby causing variations in the impact absorption performance. More specifically, with respect to a reference set to the load stress in the ambient temperature at a 50% compressive strain of the impact absorbing member formed from the polypropylene resin, a stress variation rate is 21% at the outside air temperature of −15° C., and the stress variation rate at the outside air temperature of 60° C. is −34° C.

Under these circumstances, there are placed demands on vehicle impact absorbing members of the type such as described above for removal of factors of influencing the impact absorption performance, setting of the impact absorption performance by using control means (which, in the present case, corresponds to, for example, the shapes of or the number of the recessed ribs, or the wall thicknesses of walls constituting the impact absorbing member), and improvement of temperature dependency of the impact absorption performance.

BRIEF SUMMARY OF THE INVENTION

Accordingly, an object of one embodiment of the present invention is to provide an impact absorbing member that is integrally formed by blow molding into a hollow structure, the impact absorbing member including: a main body having a hollow portion; a plurality of pairs of recessed columns formed in a manner that mutually opposite first and second walls of the main body, respectively, are recessed opposite to one another and leading ends thereof are coupled to one another; and a breaking induction portion formed on a wall constituting the impact absorbing member. In the impact absorbing member thus configured, when the impact absorbing member is crushed, part of the wall surface of the impact absorbing member is early broken to be open, whereby the influence of air existing inside the hollow portion is eliminated to thereby make it possible to exhibit a stable impact absorption performance resulting from deformation of the impact absorbing member having been crushed. Further, the impact absorbing member is formed from a thermoplastic resin, which is a polymer alloy of a polyolefin resin and an amorphous resin, whereby opening by breaking in the breaking induction section is facilitated. Accordingly, air existing inside the hollow portion is appropriately discharged to the outside air, consequently making it possible to prevent air existing inside the hollow portion from being compressed and to maintain a desired impact absorption performance to be over a wide range of low to high temperatures independently of the outside air temperature.

In order to achieve the object described above, various embodiments of the present invention provide a vehicle impact absorbing member. In one such embodiment, the impact absorbing member is formed from a thermoplastic resin and is provided internally of a vehicle structural member to absorb an impact from an interior or exterior of a vehicle, the impact absorbing member being characterized by including: a main body that is integrally formed by blow molding into a hollow structure and that includes a hollow portion; and a plurality of pairs of recessed columns formed in a manner that mutually opposite first and second walls of the main body, respectively, are recessed opposite to one another and leading ends thereof are coupled to one another, wherein at least one breaking induction portion is formed on a wall constituting the impact absorbing member.

Another embodiment provides such a vehicle impact absorbing member wherein the breaking induction portion is a relatively thinned thin-wall portion of a wall constituting the impact absorbing member.

A further embodiment of the present invention provides such a member wherein the breaking induction portion is a notch-shaped protrusion or groove formed on the wall of the impact absorbing member.

Still another embodiment of the present invention is characterized in that the breaking induction portion is a flectional portion formed on the wall of the impact absorbing member.

A still further embodiment of the present invention is characterized in that the breaking induction portion is formed in a wall forming the recessed-column, of walls constituting the impact absorbing member, which is formed such that the main body including the hollow portion and the recessed columns are formed in the manner that the mutually opposite first and second walls of the main body, respectively, are recessed opposite to one another and leading ends thereof are coupled to one another, wherein the breaking induction portion is formed on a wall constituting the impact absorbing member.

Even another embodiment of the present invention is characterized in that the impact absorbing member is formed from a thermoplastic resin having a bend elastic modulus of 10000 kg/cm$^2$ or above and an Izod impact value of 35 kg/cm$^2$ or less at an ambient temperature.

An even further embodiment of the present invention is characterized in that the impact absorbing member is formed from a thermoplastic resin that is a polymer alloy of a polyolefin resin and an amorphous resin.

Yet another embodiment of the present invention is a vehicle impact absorbing member according to one embodiment of the present invention is characterized in that the polyolefin resin is a polypropylene resin, and the amorphous resin includes at least one resin selected from the group consisting of a polypropylene resin, an ABS resin, and a modified PPE resin and a mixture thereof, wherein the thermoplastic resin made from the polymer alloy has a bend elastic modulus of 9000 to 22000 kg/cm$^2$ and an Izod impact value of 15 to 40 kg/cm$^2$.

According to a vehicle impact absorbing member in accordance with one embodiment of the present invention, the configuration thereof is formed to include a main body integrally that is formed by blow molding into a hollow structure and that includes a hollow portion, and a plurality of pairs of recessed columns formed in a manner that mutually opposite first and second walls of the main body, respectively, are recessed opposite to one another and leading ends thereof are coupled to one another; and a breaking induction portion is formed on a wall constituting the impact absorbing member. Thereby, when the impact absorbing member is crushed, part of the wall surface of the impact absorbing member is early broken to be open, whereby the influence of air existing inside the hollow portion is eliminated to thereby make it possible to exhibit a stable impact absorption performance resulting from deformation of the impact absorbing member having been crushed. Further, the impact absorbing member is formed from a thermoplastic resin, which is the polymer alloy of a polyolefin resin and an amorphous resin, whereby opening by breaking in the breaking induction section is facilitated. Accordingly, air existing inside the hollow portion is appropriately discharged to the outside air, consequently making it possible to prevent air existing inside the hollow portion from being compressed and to maintain a desired impact absorption performance over a wide range of low to high temperatures independently of the outside air temperature.

DETAILED DESCRIPTION

Embodiments of the present invention will be described in detail herebelow with reference to the accompanying drawings.

Figure 1:
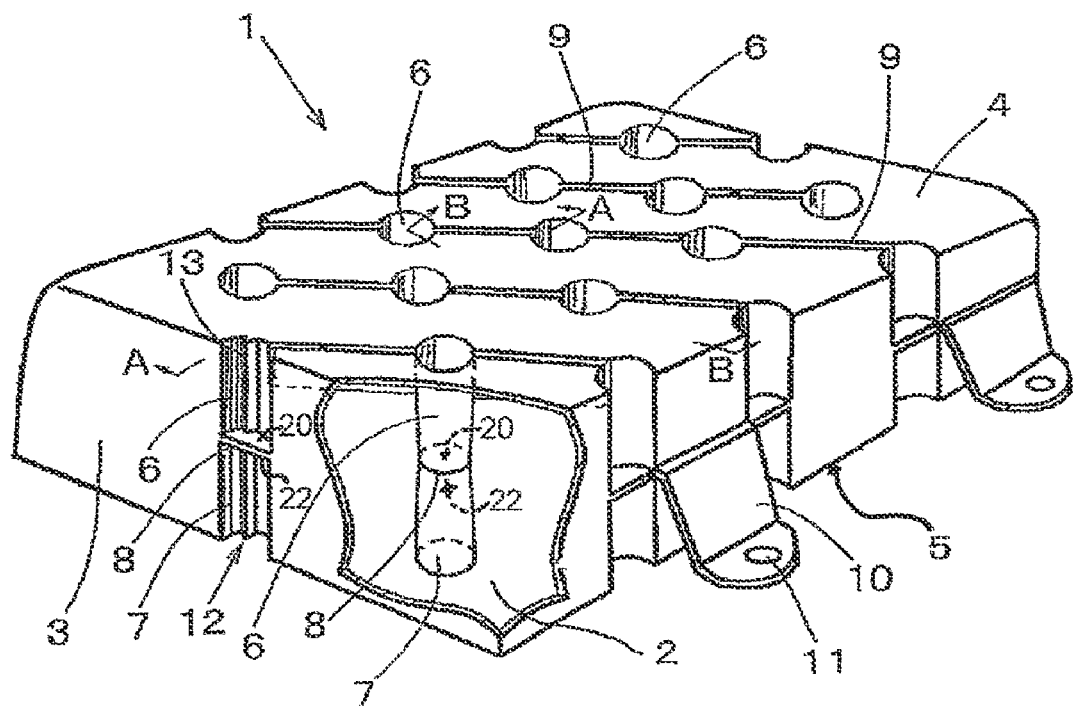
FIG. 1 is a partly disrupted perspective view of a vehicle impact absorbing member in accordance with one embodiment of the present invention.
Figure 2:
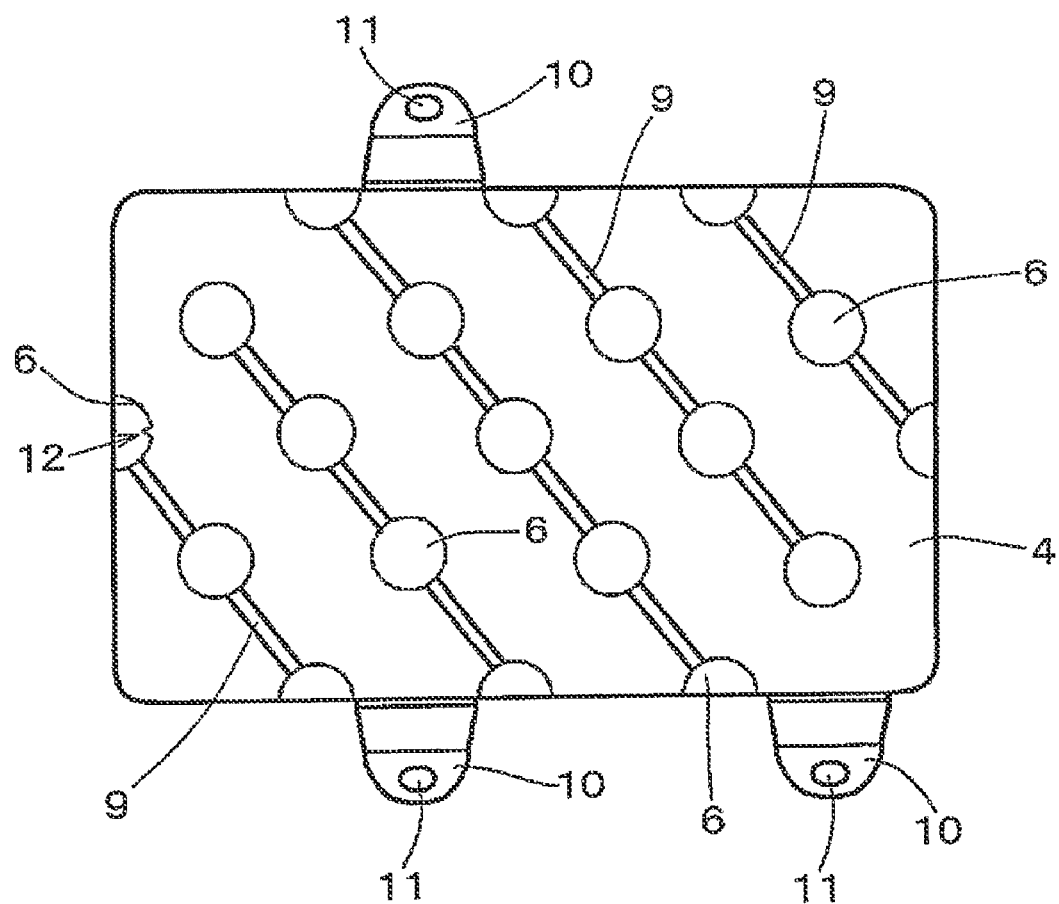
FIG. 2 is a front view of FIG. 1.
Figure 3:
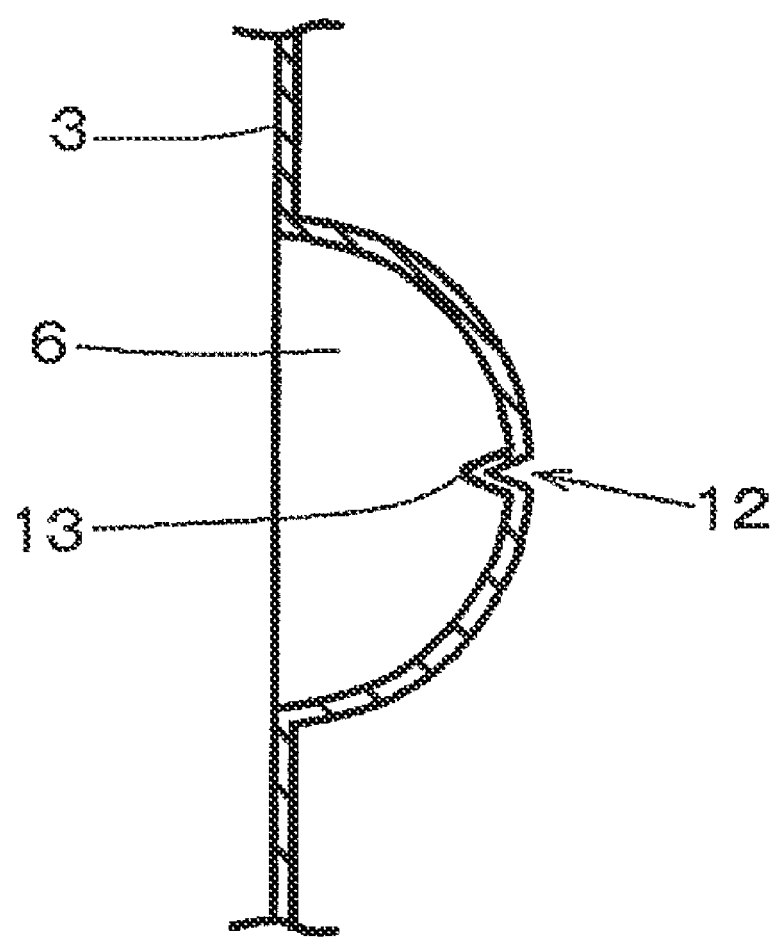
FIG. 3 is a cross sectional view of a major portion of FIG. 1.
Figure 4:
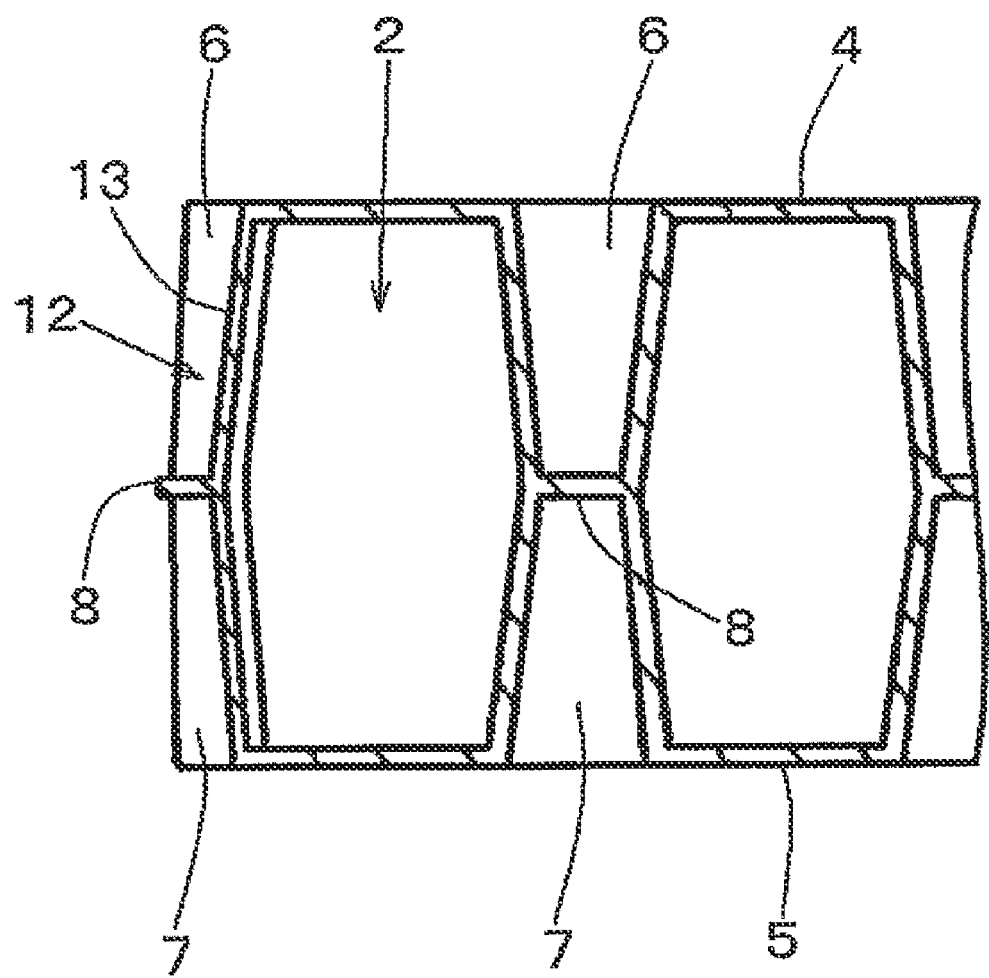
FIG. 4 is a cross sectional view taken along the line A-A of FIG. 1.
Figure 5:
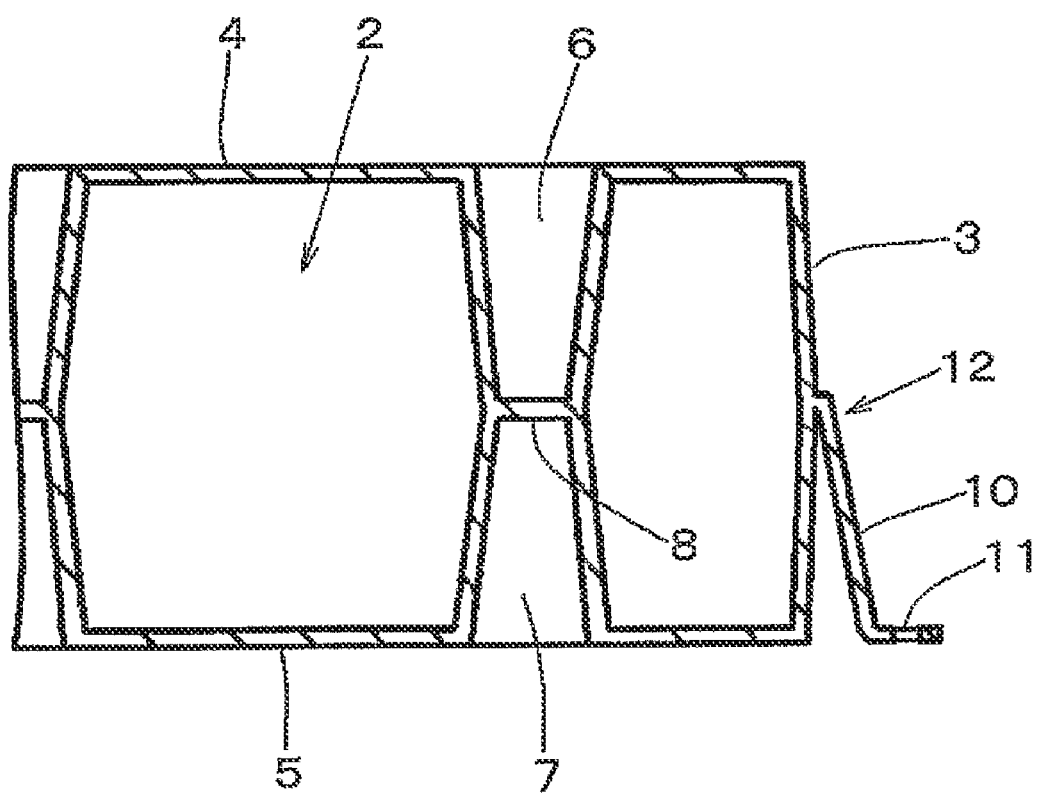
FIG. 5 is a cross sectional view taken along the line B-B of FIG. 1.
Figure 6:
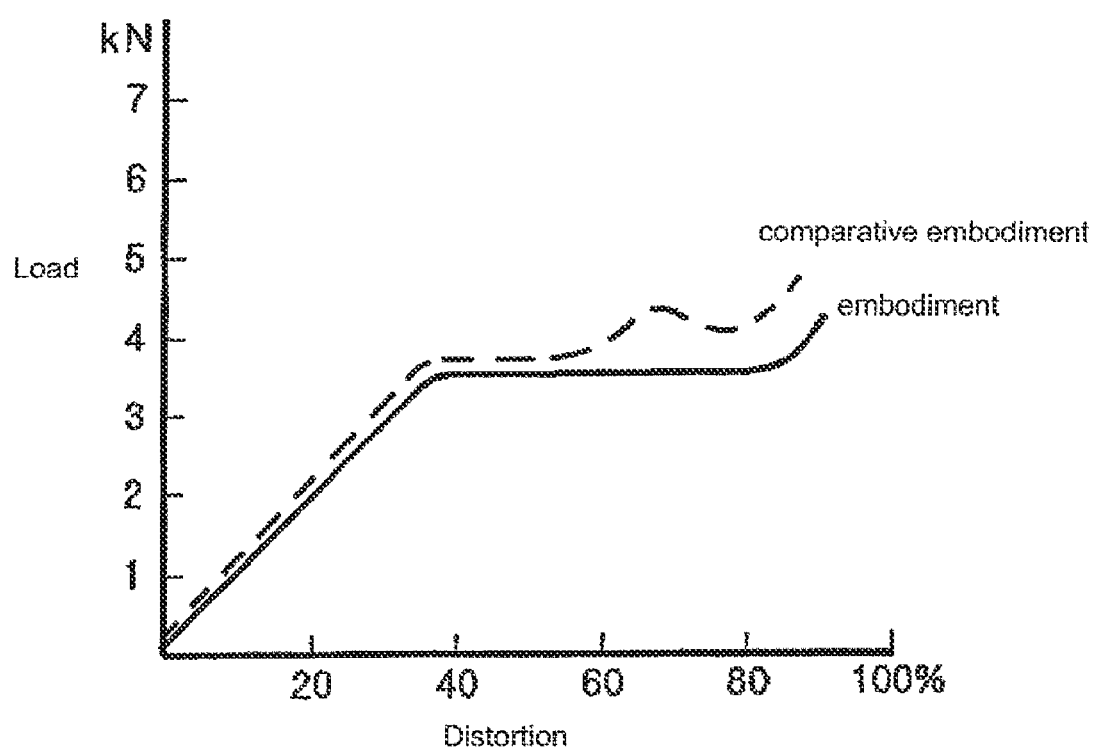
FIG. 6 is a graph showing the relationship between the load and distortion of the vehicle impact absorbing member in accordance with the one embodiment of the present invention.
Figure 7:
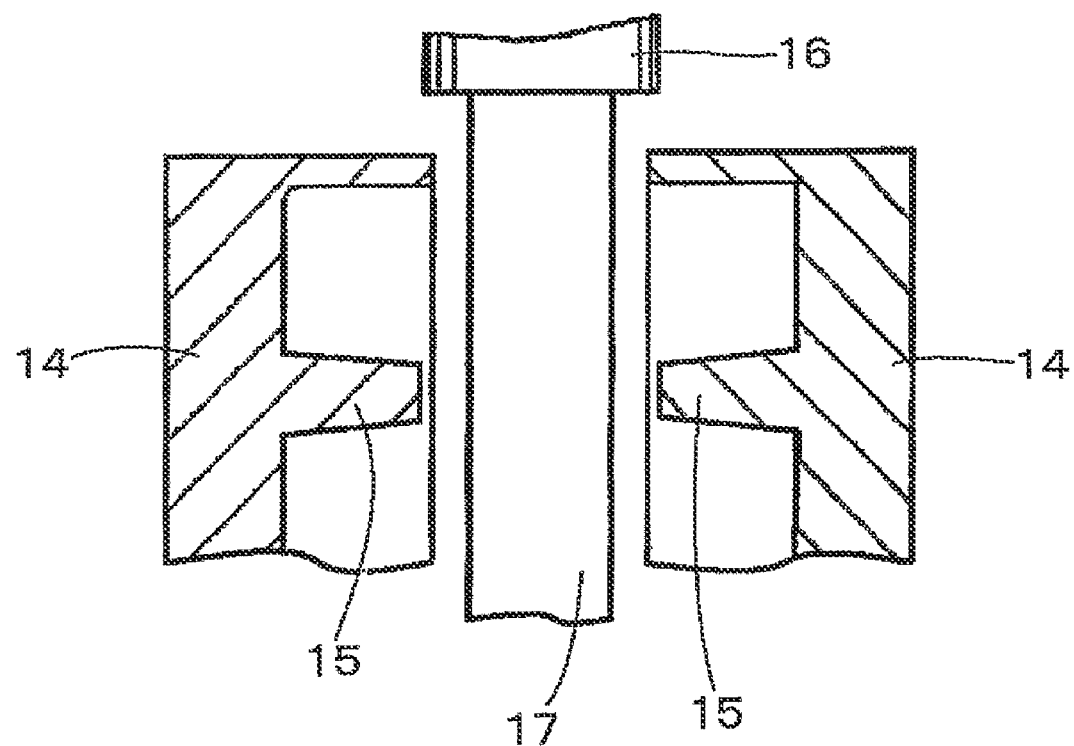
FIG. 7 is a cross sectional view showing a blow molding mode of the vehicle impact absorbing member in accordance with the one embodiment of the present invention.
Figure 8:
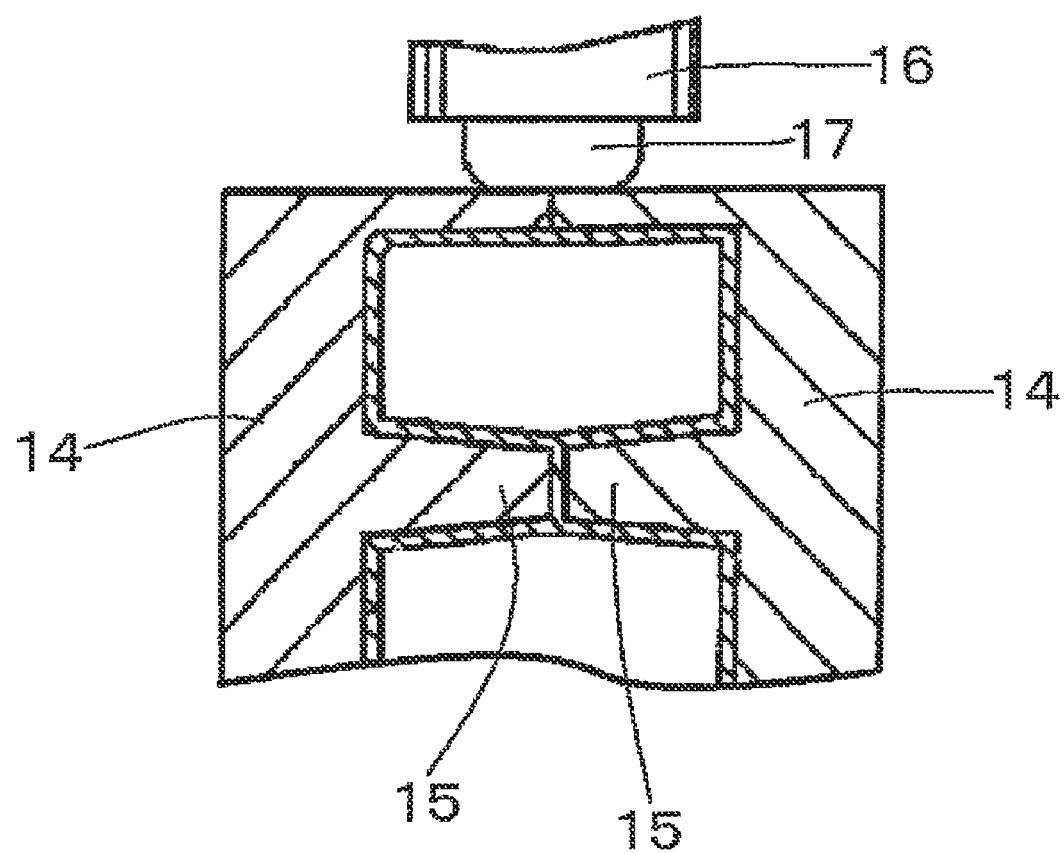
FIG. 8 is a cross sectional view showing a mold clamped state of FIG. 7.
Figure 9:
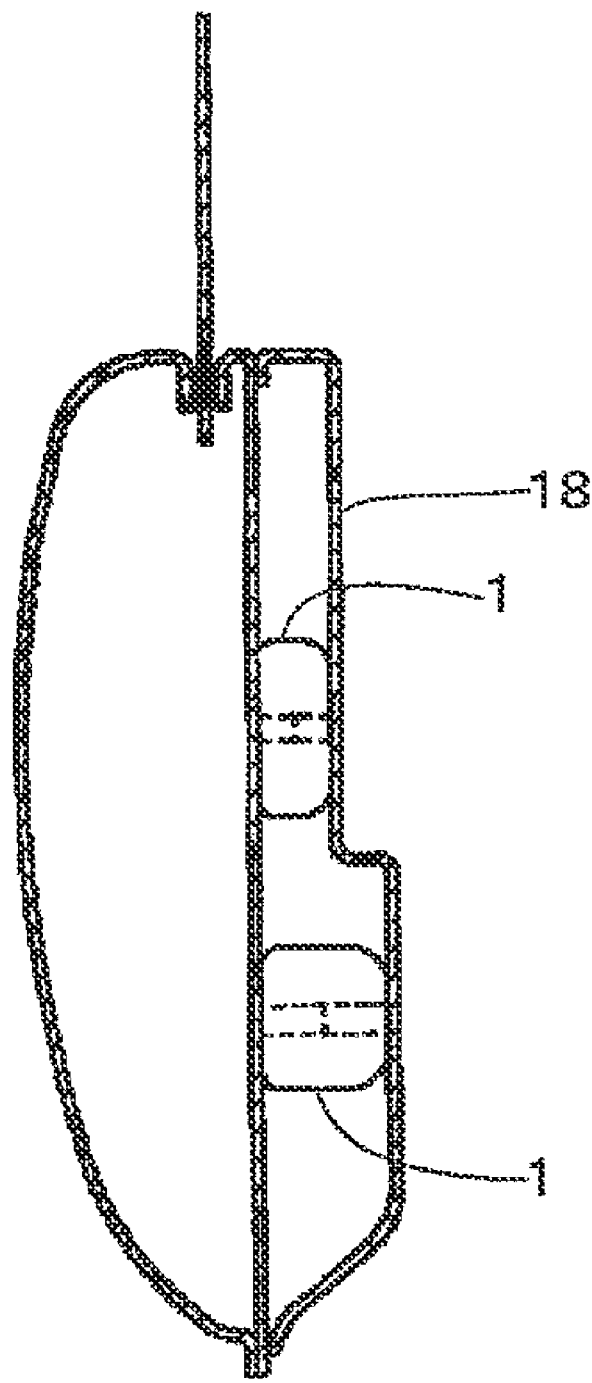
FIG. 9 is a cross sectional view showing a mode in which the vehicle impact absorbing members in accordance with one embodiment of the present invention are provided into a vehicle door trim.
Figure 10:
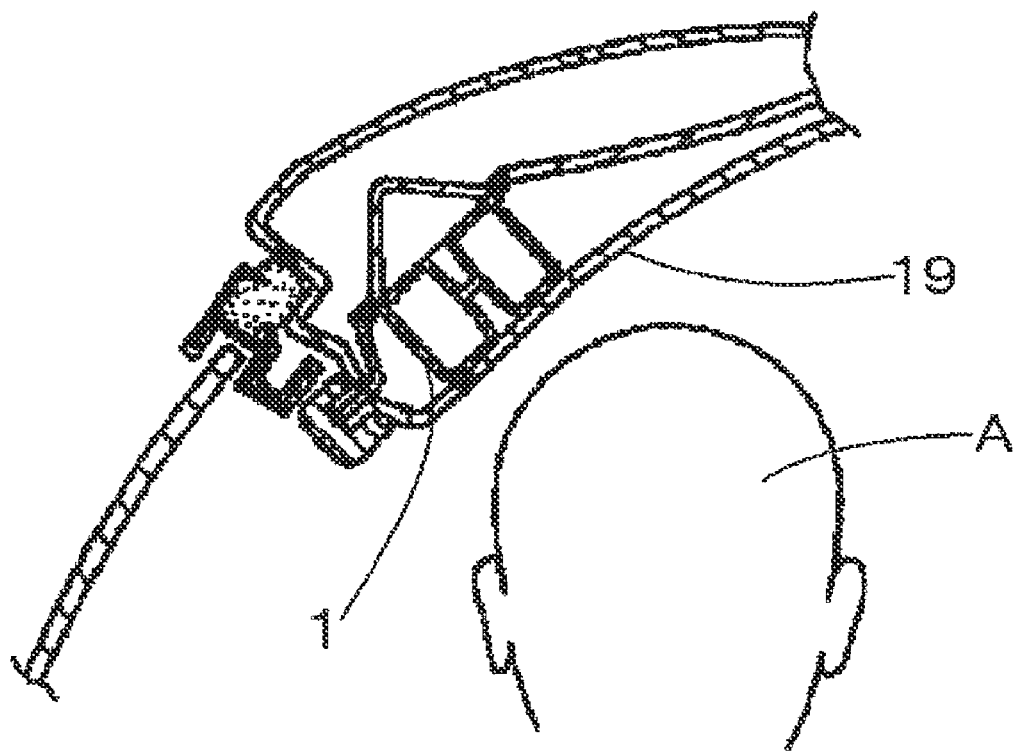
FIG. 10 is a cross sectional view showing a mode in which the vehicle impact absorbing member in accordance with one embodiment of the present invention is provided into a vehicle rear pillar.
Figure 11:
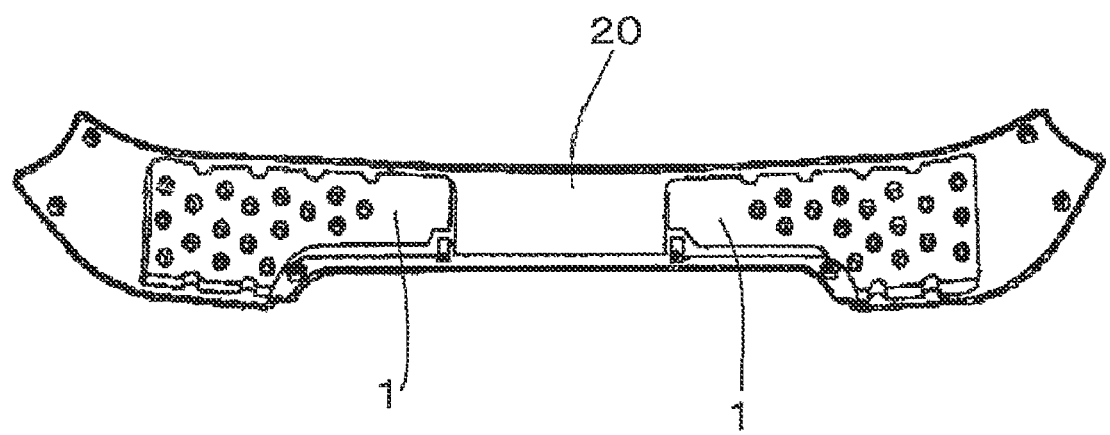
FIG. 11 is a rearside elevation view of a rear bumper into which the vehicle impact absorbing members in accordance with one embodiment of the present invention are provided.
Figure 12:
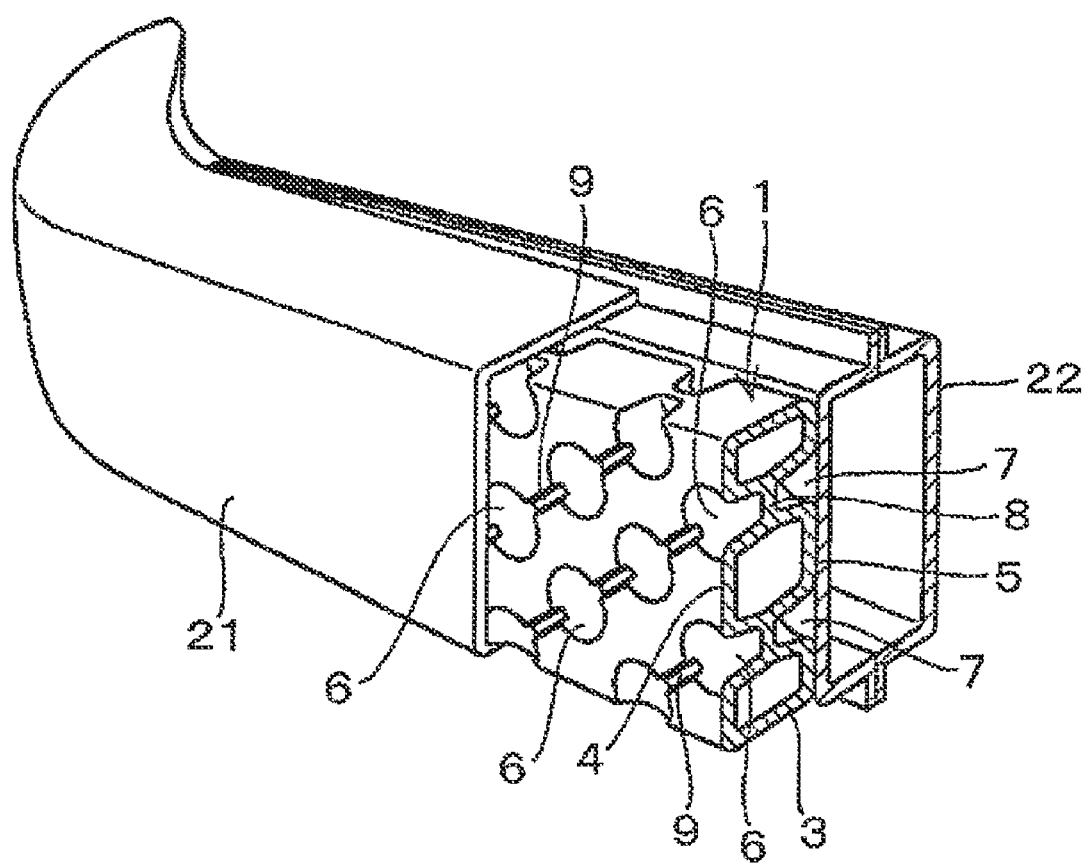
FIG. 12 is a partly disrupted perspective view of a mode in which the vehicle impact absorbing member in accordance with one embodiment of the present invention is mounted between a bumper facia and bumper beam of a front bumper.
Figure 13:
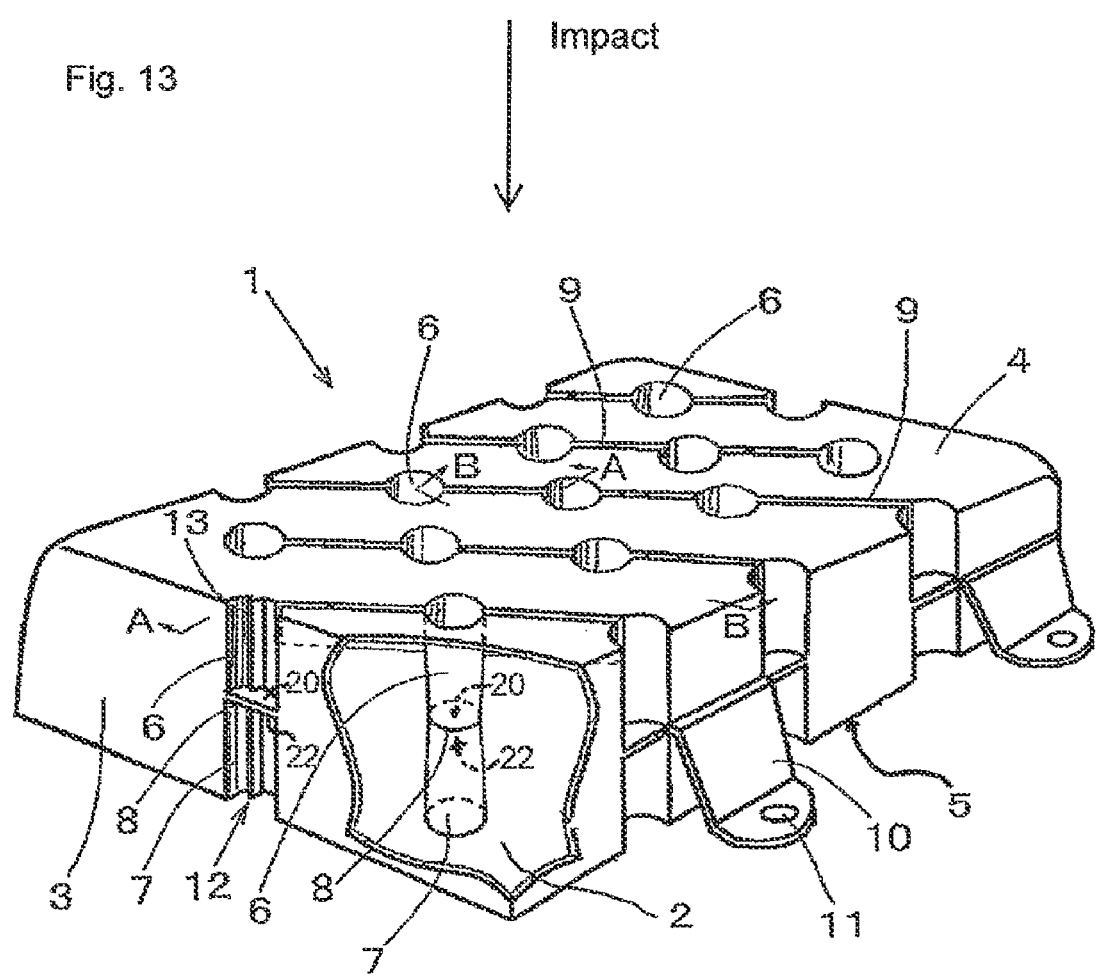
FIG. 13 is a perspective view of an impact absorbing member configured according to one embodiment of the present invention showing the direction of impact.
Figure 14:
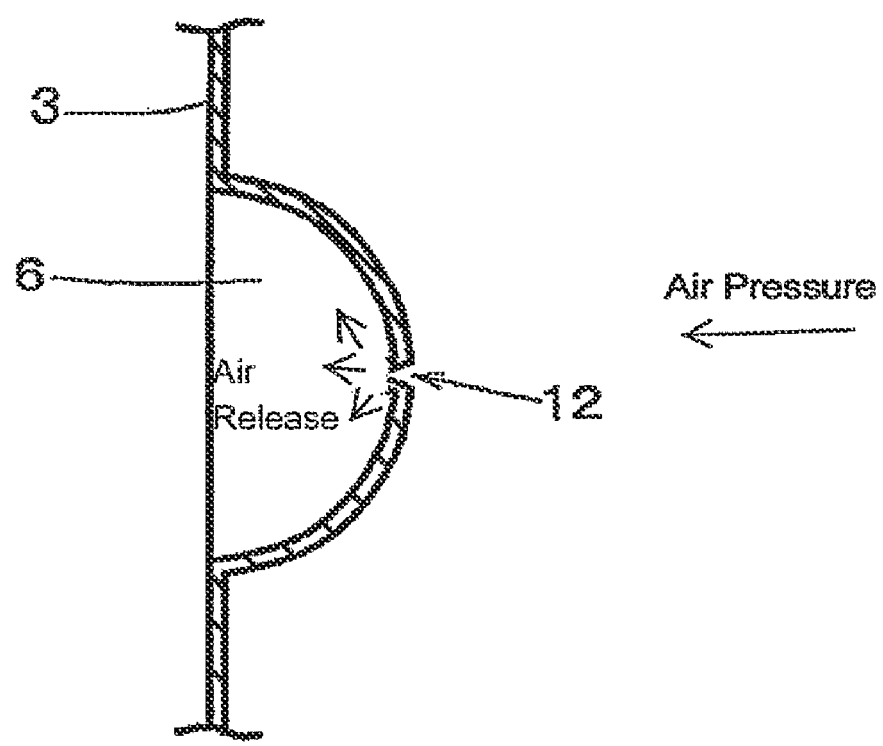
FIG. 14 is a partial plan view of a recessed column showing the effect of breakage on a breaking induction section configured according to one embodiment of the present invention.

FIG. 1 is a partly disrupted perspective view of a vehicle impact absorbing member in accordance with one embodiment of the present invention; FIG. 2 is a front view of FIG. 1; FIG. 3 is a cross sectional view of a major portion of FIG. 1; FIG. 4 is a cross sectional view taken along the line A-A of FIG. 1; FIG. 5 is a cross sectional view taken along the line B-B of FIG. 1; and FIG. 6 is a graph showing the relationship between the load and distortion of the vehicle impact absorbing member in accordance with the one embodiment of the present invention. FIG. 7 is a cross sectional view showing a blow molding mode of the vehicle impact absorbing member in accordance with the one embodiment of the present invention; and FIG. 8 is a cross sectional view showing a mold clamped state of FIG. 7. FIG. 9 is a cross sectional view showing a mode in which the vehicle impact absorbing members in accordance with the present invention are provided into a vehicle door trim; FIG. 10 is a cross sectional view showing a mode in which the vehicle impact absorbing member in accordance with the present invention is provided into a vehicle rear pillar of a vehicle; FIG. 11 is a rearside elevation view of a rear bumper into which the vehicle impact absorbing members in accordance with one embodiment of the present invention are provided; and FIG. 12 is a partly disrupted perspective view of a mode in which the vehicle impact absorbing member in accordance with the present invention is mounted between a bumper facia and bumper beam of a front bumper.

With reference to FIGS. 1 to 5, reference numeral 1 denotes an impact absorbing member. The impact absorbing member 1 is formed into a hollow shape by blow molding of a thermoplastic resin, in which reference numeral 2 denotes a hollow portion, 3 denotes a peripheral wall, 4 denotes a first wall, and 5 denotes a second wall, as illustrated in FIG. 1, the second wall 5 is the bottom wall, while opposed to it across the hollow space 2 is the top or first wall 4. The configuration includes many pairs of recessed columns 6 and 7 formed in the manner that the respective first and second walls 4 and 5, which forms the hollow-shaped impact absorbing member 1, are recessed opposite to one another, in which leading end portions of the recessed columns 6 and 7 are coupled to one another to thereby form weld surfaces 8 comprising a fusion of leading end surfaces 20, 22 of respective recessed columns 6 and 7. Connection ribs 9 are provided to the first wall 4 to connect between the recessed columns 6. A plurality of mounting pieces 10 are formed on the peripheral wall 3 of the impact absorbing member 1 towards the side of the second wall 5 from the vicinity of a parting line of the peripheral wall 3, in which reference numeral 11 denotes each of mounting openings.

At least one breaking induction section 12 is formed in the impact absorbing member 1. More specifically, in the respective recessed columns 6 and 7 opening substantially by the half, there are formed notch-shaped protrusions 13 (each having a V-shaped cross section) along the respective length directions. The notch-shaped protrusions 13 constitute the breaking induction section 12. Alternatively, the breaking induction portion 12 can be any one of a notch-shaped groove, a relatively thinned thin-wall portion of the wall constituting the impact absorbing member 1 and a flectional portion formed on the wall of the impact absorbing member 1.

As described above, any one of, for example, the thin-wall portion formed on the wall of the impact absorbing member 1 and the notch-shaped protrusion and recessed groove are suitable for the breaking induction section 12. The thin-wall portion can be formed as a leading end of any one of the notch-shaped protrusion and recessed groove and the flectional portion. The wall thickness of the thin-wall portion is not specifically limited inasmuch as it is relatively thin. However, in the case where an average thickness of the impact absorbing member is about 2.0 mm, the wall thickness of the thin-wall portion is, in one embodiment, 0.5 mm or less. In addition, in one embodiment, the protrusion 13 or recessed groove is formed into a V shape having a 1.0 to 4.0 mm width and a 2.0 to 3.0 mm depth; and it is in some embodiments the leading end of the protrusion 13 or recessed groove on the wall be relatively thin. However, the protrusion 13 or recessed groove is not limited to the above-described ranges, but can be appropriately selectable depending on the shape or size of the impact absorbing member, and can be of any type inasmuch as it is opened in response to breaking or breaking in the manner that stress is concentrated at a predetermined site by using the notch effect. Further, similarly as the notch shape, the flectional portion is formed one the wall of the impact absorbing member as a shape for concentrating the stress. In one embodiment, the flectional portion is formed into a flectional shape having a curvature radius of 3.0 mm or less, and can be formed as, for example, a boundary portion between the wall and the mounting piece of the impact absorbing member. Although the breaking induction section 12 can be formed in an arbitrary position of the wall of the impact absorbing member 1, it is, in one embodiment formed into a muscle shape extending along a direction of receiving impact on the sidewall or in the recessed column, that is, the direction substantially perpendicular to the first and second walls from the viewpoint of facilitating the opening due to breaking or rupture.

As a note of clarification, break induction sections 12 need not be on every recessed column 6,7 in the member 1, as the air within the hollow portion 2 may be released through one or more such break induction sections A vehicle impact absorbing member according to one embodiment of the invention is formed from any one of resins having high mechanical stress resistances or mechanical strengths such as rigidity, the resins including, for example, polyolefin resin such as polyethylene and polypropylene, styrene resin such as polystyrene and ABS resin, polyester resin such as polyethylene terephthalate, and polyamide. In one embodiment with an emphasis on the suitably of causing the breaking induction portion to function, any one of polypropylene, ABS resin, high impact styrene (HIPS) resin, and polyphenylene ether resin are suitable, and a blend or polymer alloy may be used. In one embodiment it is preferable to use any one of materials, such as mentioned above, having a bend elastic modulus of 10000 kg/cm$^2$ or above and an Izod impact value of 35 kg/cm$^2$ or less at the ambient temperature.

FIG. 6 is a graph showing simplified results of measurement of deflection (variations in compressive strain) against the compression load of the vehicle impact absorbing member of the present invention. As shown by the solid line in FIG. 6, according to the vehicle impact absorbing member 1 of the present invention, when the impact absorbing member 1 is crushed, part of the wall surface of the impact absorbing member 1 is early broken to be open by the breaking induction portion 12, whereby the influence of air existing inside the hollow portion 2 is eliminated, and hence stable impact absorption performance can be exhibited. In comparison, as shown by the broken line in the graph, according to the vehicle impact absorbing member without the breaking induction section 12, as the impact absorbing member is eventually crushed, air existing inside the hollow portion of the vehicle impact absorbing member is compressed, and hence the interior pressure is increased, thereby influencing the impact absorption property. In the graph, the phenomenon is manifested as fluctuations in load value, consequently making it difficult to regulate the impact absorption performance.

However, the impact absorbing member 1 is formed from the thermoplastic resin, which is the polymer alloy of the polyolefin resin and the amorphous resin. Thereby, opening by breaking in the breaking induction section 12 is facilitated, so that air existing inside the hollow portion 2 is discharged to the outside air. Consequently, air existing inside the hollow portion 2 can be prevented from being compressed, and a desired impact absorption performance can be maintained over a wide range of low to high temperatures independently of the outside air temperature.

The impact absorbing member 1 shown in FIGS. 1 to 4 is blow molded, as shown in FIGS. 7 and 8. More specifically, reference numeral 14 denotes each of a pair of split molds, 15 denotes each of recessed column forming cavities, 16 denotes an extruding die, and 17 denotes a parison. As shown in FIG. 7, the parison 17 is positioned between the pair of split molds 14, and thereafter, as shown in FIG. 8, the molds are clamped, a blow nozzle (not shown) is inserted into the parison, and the blow molding is carried out.

FIGS. 9 to 11, respectively, show utilization examples of the vehicle impact absorbing member in accordance with one embodiment of the present invention. More specifically, FIG. 9 shows an example of in which the vehicle impact absorbing members are provided in a vehicle door trim 18; FIG. 10 shows an example in which the vehicle impact absorbing member is provided in a vehicle rear pillar 10; and FIG. 11 shows an example in which the vehicle impact absorbing members are provided in a rear bumper 20. In FIG. 10, "A" indicates a head portion of a passenger. FIG. 12 shows an example in which the vehicle impact absorbing member is provided between a bumper facia and bumper beam of a front bumper.

The vehicle impact absorbing member in accordance with one embodiment of the present invention is provided in any one of vehicle structural members, such as a door, door trim, bodyside panel, roof panel, pillar, and bumper of a motor vehicle or the like, thereby to be able to significantly improve impact absorbing property in the respective portion. Consequently, the vehicle impact absorbing member significantly contributes to motor vehicle safety improvement.

The invention claimed is:

1. A vehicle impact absorbing member formed from a thermoplastic resin by blow molding comprising:
    opposing first and second walls partially defining a hollow portion;
    a plurality of first recessed columns integrally molded from said first wall;
    a plurality of second recessed columns integrally molded from said second wall;
    weld surface being welded leading end surfaces of the first and second recessed columns; and
    at least one breaking induction section formed on at least one of said first recessed columns.

2. A vehicle impact absorbing member according to claim 1, wherein the breaking induction section is a relatively thinned thin-wall portion of a wall of at least one said first recessed column.

3. A vehicle impact absorbing member according to claim 1 wherein the breaking induction section is a notch-shaped protrusion or groove formed on a wall of at least one of said first recessed column.

4. A vehicle impact absorbing member according to claim 1, wherein the breaking induction section is a flectional portion of a wall of at least one of said first recessed column.

5. A vehicle impact absorbing member according to claim 1, further comprising an additional breaking induction section is formed in a wall of either said first recessed column or said second recessed column.

6. A vehicle impact absorbing member according to claim 1, wherein the impact absorbing member is formed from a thermoplastic resin having a bend elastic modulus of 10000 $kg/cm^2$ or above and an Izod impact value of 35 $kg/cm^2$ or less at an ambient temperature.

7. A vehicle impact absorbing member according to claim 1, wherein the impact absorbing member is formed from a thermoplastic resin that is a polymer alloy of a polyolefin resin and an amorphous resin.

8. A vehicle impact absorbing member according to claim 7, wherein the polyolefin resin is a polypropylene resin, and the amorphous resin comprises at least one resin selected from the group consisting of a polypropylene resin, an ABS resin, and a modified PPE resin and a mixture thereof.

* * * * *